US006988140B2

(12) United States Patent
Chintalapati et al.

(10) Patent No.: US 6,988,140 B2
(45) Date of Patent: Jan. 17, 2006

(54) MECHANISM FOR SERVICING CONNECTIONS BY DISASSOCIATING PROCESSING RESOURCES FROM IDLE CONNECTIONS AND MONITORING THE IDLE CONNECTIONS FOR ACTIVITY

(75) Inventors: Murthy Chintalapati, Santa Clara, CA (US); Pallab Bhattacharya, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 853 days.

(21) Appl. No.: 09/792,807

(22) Filed: Feb. 23, 2001

(65) Prior Publication Data

US 2002/0156897 A1 Oct. 24, 2002

(51) Int. Cl.
*G06F 15/177* (2006.01)
(52) U.S. Cl. .................. 709/227; 709/237; 709/224; 710/46
(58) Field of Classification Search ............... 710/220, 710/46, 44; 709/224, 227, 237, 202, 203
See application file for complete search history.

(56) References Cited

U.S. PATENT DOCUMENTS

| 5,652,839 | A | * | 7/1997 | Giorgio et al. | ............. 709/224 |
| 5,822,534 | A | * | 10/1998 | Yamunachari et al. | ...... 709/224 |
| 5,854,897 | A | * | 12/1998 | Radziewicz et al. | ......... 709/224 |
| 6,105,067 | A | * | 8/2000 | Batra | ......................... 709/227 |
| 6,138,160 | A | * | 10/2000 | Boies et al. | ................. 709/227 |
| 6,434,543 | B1 | * | 8/2002 | Goldberg et al. | ............... 707/2 |
| 6,571,290 | B2 | * | 5/2003 | Selgas et al. | ................ 709/228 |
| 6,745,224 | B1 | * | 6/2004 | D'Souza et al. | ............ 709/202 |
| 6,760,416 | B1 | * | 7/2004 | Banks et al. | ........... 379/114.01 |

* cited by examiner

*Primary Examiner*—Kenneth R. Coulter
(74) *Attorney, Agent, or Firm*—Hickman Palermo Truong & Becker, LLP; Christopher J. Brokaw (57) ABSTRACT

A mechanism for servicing connections by disassociating processing resources from idle connections and monitoring the idle connections for activity is described. In one embodiment, a connection that is being serviced by a processing resource is disassociated from the processing resource when the connection is idle. The connection is handed to a poll manager for placement into one of several poll subsets. A poll thread associated with each poll subset is sends the poll subsets and poll requests to a poll adapter. The poll adapter uses the features of the operating system to monitor the connection for activity, such as by polling the connections to identify any pending events. The approach may be implemented on different operating systems by changing the poll adapter. The poll manager passes active connections to a work queue to wait for servicing. The present invention avoids wasting resources on connections that are idle.

47 Claims, 6 Drawing Sheets

MECHANISM FOR SERVICING CONNECTIONS BY DISASSOCIATING PROCESSING RESOURCES FROM IDLE CONNECTIONS AND MONITORING THE IDLE CONNECTIONS FOR ACTIVITY

FIELD OF THE INVENTION

This invention relates generally to computer systems, and more particularly to a mechanism for servicing connections by disassociating processing resources from idle connections and monitoring the idle connections for activity.

BACKGROUND

Computer systems establish connections between entities over networks. One type of network connection is a client-server connection in which a client requests information from a server. For example, the client may be a browser application being used by a person on a general personal computer, and the server may be another computer that provides electronic documents to the client. The electronic documents may be Web pages that the user requests from the server over the worldwide packet data communication network now commonly known as the Internet. The World Wide Web may be defined as all of the resources and users on the Internet that communicate using the hypertext transfer protocol (HTTP).

Each such connection established between the serer and the client uses resources provided by an operating system at the server. For example, for each connection, the operating system may associate a connection socket file descriptor, a heap segment, and a request handling thread.

Request handling threads, also known as worker threads, are an example of a processing resource that is used by a server to service a connection. Processing resources include other types of resources, such as acceptor threads, that help to establish connections on the server side. Processing resources are often part of a larger processing resource, such as a daemon. Daemons are programs that run continuously on a server and exist to handle requests for service from clients and the users associated with the clients.

As used herein, the term "connection" refers to a socket abstraction that has all the information relevant to the communication path between a server and a client, such as the transmission control protocol/Internet protocol (TCP/IP) addresses of the server and client, port numbers, etc. As used herein, "establishing a connection" means accepting a connection on the server side by assigning a file descriptor that is associated with the TCP layer to a processing resource. The file descriptor is uniquely associated with an operating system data structure with the information relevant to the communication path. Although a connection is associated with a file descriptor, a connection is not a file.

Originally, the World Wide Web was intended to be "connectionless" meaning that after a processing resource services a request from a client, the processing resource is made available to handle additional requests that may come from the same or different clients. To the extent that a connection is established between the client and the server in such a connectionless system, the connection exists only as long as necessary to process the request.

In contrast, a connection-based system establishes a connection between the client and the server and associates a particular request handling thread with the connection. All requests received over the connection are processed by the particular request handling thread as long as the connection is open, and any requests received over other connections are processed by other request handling threads. When the connection is closed, the particular request handling thread is made available to be associated with another connection. Such connections are referred to as persistent connections because the connection persists to process additional requests on the same connection after the current request is processed. With a connectionless approach, the request processing resource automatically disassociates the connection by closing the connection after servicing the request. Thus, only one request per connection is serviced.

Establishing connections consumes the resources of the operating system at the server. For example, before exchanging data between the client and the server, a three-step handshake protocol is typically followed, which consumes processing time and other resources from the server. The more resources the server devotes to following the handshake protocol for new connections, the fewer resources are available for the server to process requests received over connections.

In addition, when a client interacts with a server, there are often numerous separate requests between the client and the server. For example, the client may request a Web page that contains objects, or links, to several graphics files that must be requested from the server using additional requests. As another example, a user visiting a Web site may visit numerous Web pages associated with the site in rapid succession, and each Web page is retrieved by the client from the server in a separate request. Generally in a connectionless system, the three-way handshake protocol is performed prior to servicing each of these many requests. When there are numerous requests over a short time between a particular client and a particular server, resources are wasted in repeatedly executing the handshaking protocol between the same client and the server.

As a result, there has been a trend during the development of HTTP to provide for persistent connections to avoid or minimize connection establishment and tear-down overhead. For example, in HTTP Version 0.9, there is no capability to establish a persistent connection between a server and a client. All interactions under HTTP Version 0.9 are connectionless. In HTTP Version 1.0, the connectionless approach is still the default approach, but a connection may be defined to be persistent, such as by using the HTTP header mark-up "Keep-Alive" by the client. For such persistent connections, the server maintains the connection for a predefined length of time. In HTTP Version 1.1, the default approach to establishing connections is to have persistent connections. The persistent connections are closed when the server decides to close the connections, such as following a predefined period of time, or when the client or the server requests that the connection be closed. Thus, the trend towards connection-based communications between clients and servers avoids the unnecessary expenditure of resources that would be required in a connectionless system when there are multiple requests between a client and a server. However, connection-based communications may result in processing resources being idle while waiting for additional requests over the connection, as explained further below.

When a client sends a request for a connection to a server, the request is handled by a daemon. The daemon includes different types of processing resources for servicing connections and generating responses to the requests received over the connections. One type of processing resource is an acceptor thread, which is used for accepting a connection request, establishing the connection at the server, and placing the connection into a work queue to await processing.

The work queue has one or more places or slots for holding connections. The daemon may include worker threads that service the connection by picking up a connection from the work queue, receiving requests sent from the client to the server over the connection, and generating responses to the requests.

If the server implements a synchronous input/output (I/O) model, such as in the Unix operating system, each connection is serviced by one worker thread that is dedicated to the connection. The worker thread receives all of the requests from the client over the connection and generates responses for each request. The worker thread remains associated with the connection until the connection is closed. While the worker thread is associated with the connection, the worker thread does not service other connections.

The synchronous I/O model presents an efficiency problem when connections experience "idle" time. A connection may be idle while waiting for the user at the client device to submit another request, such as by selecting another link on a Web page. Idle connections may cause inefficiency because the worker threads assigned to the idle connections are not performing any work, and the number of worker threads that can be supported by the daemon is limited. It is possible that a server may have all available worker threads dedicated to connections, many of which may be idle, yet there are additional connections waiting to be serviced, thereby impacting the ability of the server to efficiently service the connections.

Figure 1:
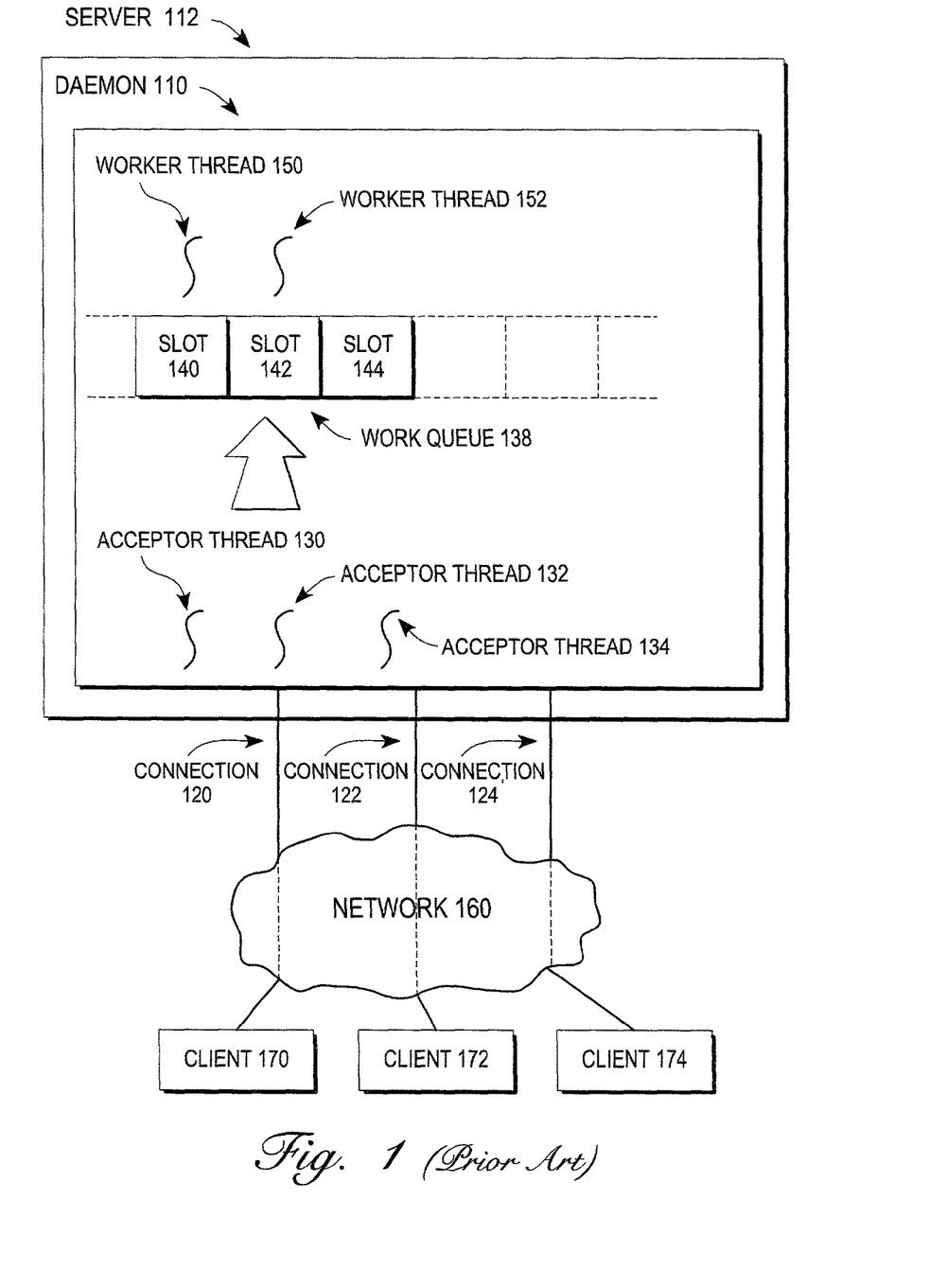
FIG. 1 is a block diagram that illustrates a daemon that services connections.

FIG. 1 is a block diagram that illustrates a daemon that services connections. Although FIG. 1 illustrates a limited number of types of elements and a few examples of each element type, in practice numerous additional element types and elements are included. However, for purposes of simplifying the following explanation, only a few representative examples are illustrated. In addition, the elements shown may be implemented by software, hardware, or a combination thereof, on one or more physical devices.

FIG. 1 shows a daemon 110 that is responsible for servicing connections 120, 122, 124 between clients 170, 172, 174 and a server 112. A network 160, such as the Internet, provides the means for communicatively coupling clients 170, 172, 174 to server 112. Daemon 110 includes acceptor threads 130, 132, 134 that are responsible for accepting connections 120, 122, 124 at server 112 and passing connections 120, 122, 124 to a work queue 138. Work queue 138 includes a number of slots or positions for holding connections that are waiting to be serviced, of which slots 140, 142, 144 are shown. Connections 120, 122, 124 are passed by acceptor threads 130, 132, 134 to slots 140, 142, 144, respectively.

Work queue 138 holds connections 120, 122, 124 until a worker thread is available to service each of connections 120, 122, 124. Daemon 110 includes worker threads 150, 152 for servicing the connections in work queue 138. For example, worker thread 150 picks up connection 120 from slot 140 and process the requests received from client 170 over connection 120. Similarly, worker thread 152 picks up connection 122 from slot 142 and process requests received from client 172 over connection 122. Because the example of FIG. 1 only has two worker threads, connection 124 must wait in slot 144 of work queue 138 to be serviced. Thus, when using the synchronous I/O model, once connection 120 is closed, worker thread 150 is available to service another connection, such as connection 124.

In the example illustrated in FIG. 1, there are only two worker threads, yet there are three connections. If worker thread 150 is servicing connection 120 and worker thread 152 is servicing connection 122, then connection 124 must wait in slot 144 of work queue 138 until one of the two worker threads becomes available. With the synchronous I/O model, worker thread 150 remains dedicated to connection 120 until connection 120 is closed, and worker thread 152 remains dedicated to connection 122 until connection 122 is closed. If connections 120, 122 are frequently idle, then server 112 is using all of the available worker threads to do little or no work while a third connection, connection 124, sits waiting with one or more requests to be serviced.

One approach for addressing the efficiency problem of the synchronous I/O model is to implement an asynchronous I/O model at the server. With an asynchronous I/O model, each connection may be serviced by many threads because processing resources, such as worker threads, are not dedicated to connections until the connections are closed. Instead, each request is independent of the other requests, even if the connection is persistent. For example, a first worker thread processes the first request received over a connection and generates a response. Once the first request is serviced, the worker thread is made available to service another connection in the work queue. When a second request is received over the connection, the connection is added to the work queue to await servicing by another worker thread. While it is possible that the same worker thread services the second request, such an occurrence is a product of chance instead of a feature or characteristic of the asynchronous I/O model.

For example, in FIG. 1, if the I/O model is asynchronous, worker threads 150, 152 are only associated with connections 120, 122, respectively, during the servicing of requests as long as connections 120, 122 remain active. If worker thread 150 is servicing connection 120 and connection 120 becomes idle, worker thread 150 is made available to service another connection, such as connection 124. If another request is received over connection 120, connection 120 waits in work queue 138 until another worker thread is made available, say worker thread 152 after connection 122 becomes idle.

A problem with using the asynchronous approach to solve the worker thread efficiency problem that arises with the synchronous approach is that not all servers implement the asynchronous I/O model. Some types of servers and operating systems use the synchronous approach for other reasons, and thus incur the inefficiency problem described above.

Based on the foregoing, there exists a need for a mechanism for servicing connections that minimizes the resources required when there are idle periods for the connections.

SUMMARY OF THE INVENTION

To overcome the shortcomings of the prior art, the present invention provides a mechanism for servicing connections by disassociating processing resources from connections that become idle and monitoring the idle connections for activity. Based at least partially on the observation that there are times when a connection is idle and therefore does not need to be serviced by a processing resource, the present invention disassociates processing resources from connections that are idle. In one embodiment, a processing resource is disassociated from a connection that has become idle. The connection is passed off to a poll manager that puts the connection in one of a number of poll subsets. Each poll subset is associated with a poll thread that sends a poll request to a poll adapter. The poll request identifies the connections for a particular poll subset and may identify which types of events are to be checked for the connection.

The poll adapter uses the synchronous or asynchronous features of the operating system to monitor the connection for activity, such as by polling the connections to determine whether any events are pending. Based on the poll results from the poll adapter, the poll thread for the poll subset determines whether the connection is now active or remains idle. If the connection is active, the poll thread passes the connection to the work queue to await servicing by a processing resource. If the connection is still idle, the connection remains in the poll subset. The poll threads poll the connections in each subset according to a predefined interval of time. The poll threads may track how long each connection is idle and close connections that have been idle for a predetermined time period.

By disassociating processing resources from idle connections and monitoring the idle connections for activity, the present invention eliminates the waste of system resources that results from the connection servicing approaches of the prior art. Thus, the present invention provides an improved mechanism for servicing connections.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A mechanism for servicing connections by disassociating processing resources from idle connections and monitoring the idle connections for activity is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various functions shall be discussed under topic headings that appear in the following order:

| | |
|---|---|
| I. | STRUCTURAL AND FUNCTIONAL OVERVIEW |
| II. | PROCESS OVERVIEW |
| III. | DETERMINING WHETHER A CONNECTION IS IDLE |
| IV. | DISASSOCIATING IDLE CONNECTIONS |
| V. | POLL MANAGER |
| VI. | POLL SUBSETS |
| VII. | POLL ADAPTER |
| VIII. | MONITORING CONNECTIONS |
| IX. | CLOSING A CONNECTION |
| X. | WORK SUB-QUEUES |
| XI. | HARDWARE OVERVIEW |

I. Structural and Functional Overview

Figure 2:
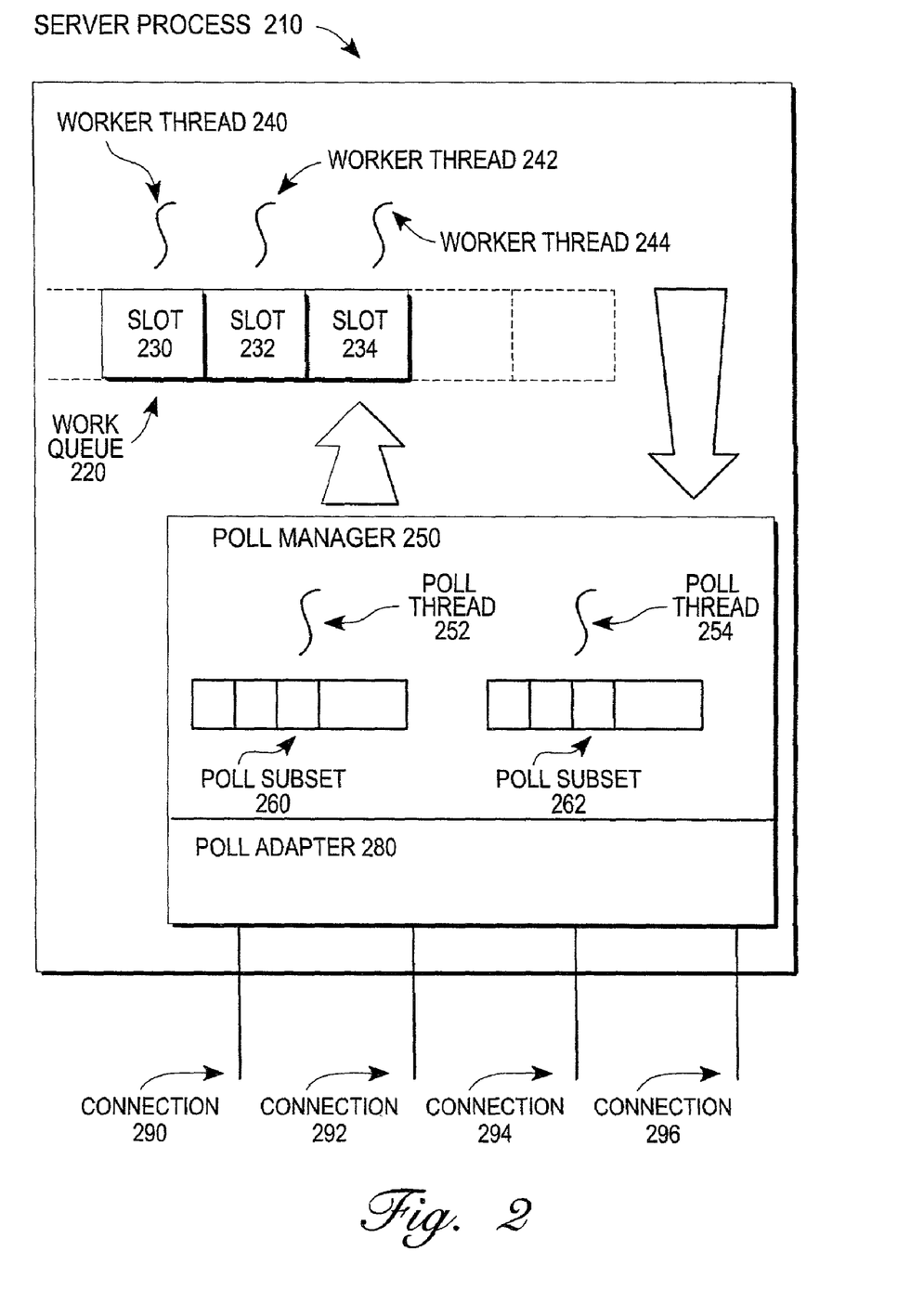
FIG. 2 is a logical block diagram that illustrates a high level overview of one embodiment of a mechanism for servicing connections by disassociating processing resources from idle connections and monitoring the idle connections for activity.

FIG. 2 is a logical block diagram that illustrates a high level overview of one embodiment of a mechanism for servicing connections by disassociating processing resources from idle connections and monitoring the idle connections for activity.

In FIG. 2, there is a server process 210, such as a daemon described above. Server process 210 includes a work queue 220 for holding connections waiting to be serviced. Work queue 220 includes a plurality of slots, each of which may hold a connection. For the sake of simplicity, only slots 230, 232, 234 are shown. Server process 210 may include resources, such as acceptor threads discussed above in reference to FIG. 1, for establishing connections and passing connections, although for the sake of simplicity such resources are omitted from FIG. 2.

Server process 210 includes a plurality of processing resources, each of which is capable of servicing a connection. For the sake of simplicity, only three processing resources are shown, namely worker threads 240, 242, 244. For example, each of worker threads 240, 242, 244 tries to read request data from the connection during the processing cycle of worker thread 240, 242, 244. Once a request is completely handled, worker thread 240, 242, 244 iterates over the connection for further pipelined requests, and if such further requests exist, continues processing. If exceptions occur on the connection, such as that the connection was broken by the client or network, worker thread 240, 242, 244 terminates the connection to free server side resources, and then worker thread 240, 242, 244 returns to work queue 220 to service another connection.

As used herein, a "processing resource" is a logical entity that is used by a server to service connections, such as by managing connections, processing requests and exceptions that occur on a connection, and taking actions in response to the requests and exceptions. For example, if the processing resource reads request data from the connection, the processing resource generates a response based on the data that is read. If an exception occurs on the connection, such as that the peer has closed the connection, the processing resource closes the connection at the server. Examples of processing resources include, but are not limited to, acceptor threads and request handling threads. The latter are also referred to as worker threads. Processing resources may be part of another logical entity on the server, such as a daemon as described above.

A connection is "idle" if no requests are pending while the connection is still open and there are no requests from the connection being processed by a processing resource.

FIG. 2, there is also a poll manager 250. Poll manager 250 receives idle connections from worker threads 240, 242, 244 and passes active connections to work queue 220 where the active connections wait for servicing by worker threads 240, 242, 244. Poll manager 250 includes a plurality of poll subsets, of which only poll subsets 260, 262 are shown for the sake of simplicity. Poll subsets 260, 262 hold the idle connections that are passed from worker threads 240, 242, 244 to poll manager 250.

Because idle connections may be held in poll subsets and active connections may be serviced by worker threads, the total number of connections managed by server process 210 may be more than the number of worker threads that are available for server process 210. For example, in a typical system using the synchronous I/O model that dedicates a worker thread to each connection, the number of connections that can be serviced by server process 210 is limited by the number of work threads. However, in a system that incorporates poll manager 250, the capability of passing off idle connections to poll manager 250 can significantly increase the number of connections that can be serviced by server process 210. As a result of using poll manager 250 to track idle connections, server process 210 may be described as multiplexing the connections because more connections may be handled than there are processing resources to service the connections.

In one embodiment, poll manager 250 includes a plurality of poll threads that are each associated with a poll subset. In FIG. 2, only poll threads 252, 254 are shown, and each of the poll threads 252, 254 is associated with poll subset 260, 262, as shown. Poll threads are processing resources used by poll manager 250 to determine if the connections held in the poll subsets have become active. In FIG. 2, connections 290, 292 are associated with poll subset 260 and connections 294, 296 are associated with poll subset 262.

Server process 210 includes a poll adapter 280 that is communicatively coupled to poll manager 250. Poll adapter 280 receives requests from poll thread 252 to determine whether the connections associated with a particular poll subset have become active. For example, poll thread 252 is configured to check for activity on the connections associated with poll subset 260 at predefined intervals, such as every X seconds. Poll thread 252 initiates the check for activity by sending a poll request to poll adapter 280. The poll request includes poll subset 260, which identifies that connections 290, 292 are to be checked for activity, and the types of events that poll thread 252 is interested in checking for on connections 290, 292.

Poll adapter 280 is a logical module that performs the polling, or monitoring, function for the connections identified in the poll requests from the poll threads. Poll adapter 280 uses poll system calls or other similar operating system functions or features to determine whether an event is pending for the connection. By implementing poll adapter 280 as a logical module, or an "adapter," the functionality of poll adapter 280 may be implemented in any manner that takes advantage of the underlying operating environment. Poll adapter 280 responds to the poll requests with an indication of whether an event is pending for each connection identified in the request, and if an event is pending, the type of event, such as a data request or an exception that indicates that the client has closed the connection.

As used herein, an "event" is an occurrence on a connection. Occurrences include the sending by a peer of request data or an exception, such as that the peer has closed a connection. A connection is "active" if there are events occurring on the connection, there are events from the connection being processed by a processing resource, or there are events pending for the connection. An event is "pending" if the event has occurred on the connection, but the connection has not been picked up by a processing resource for servicing.

If poll manager 250 receives a determination from poll adapter 280 that a connection is active, then poll manager 250 passes the active connection to work queue 220 where the active connection will wait until a processing resource, such as worker thread 240, picks up the now active connection for servicing.

Poll thread 252 may perform other functions. For example, if poll adapter 280 indicates that connection 294 has been closed at the client, poll thread 252 will close connection 294. As another example, poll thread 252 may check to see how long connection 296 has been idle. If connection 296 has been idle for longer than a predetermined amount of time, then poll thread 252 closes connection 296.

II. Process Overview

Figure 3A:
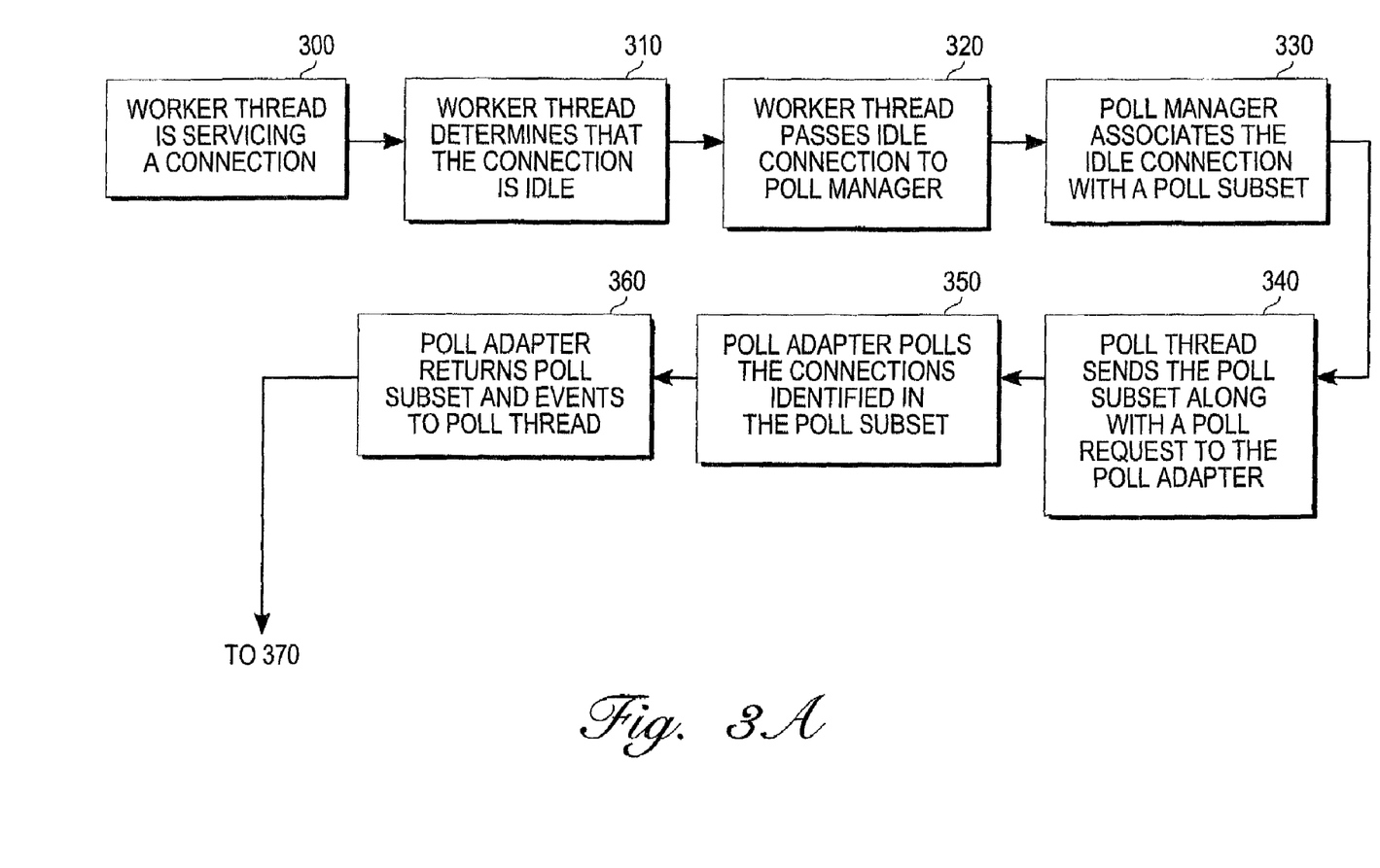
FIG. 3A and FIG. 3B are flowcharts that illustrates a high level overview of one embodiment of a mechanism for servicing connections by disassociating processing resources from idle connections and monitoring the idle connections for activity.
Figure 3B:
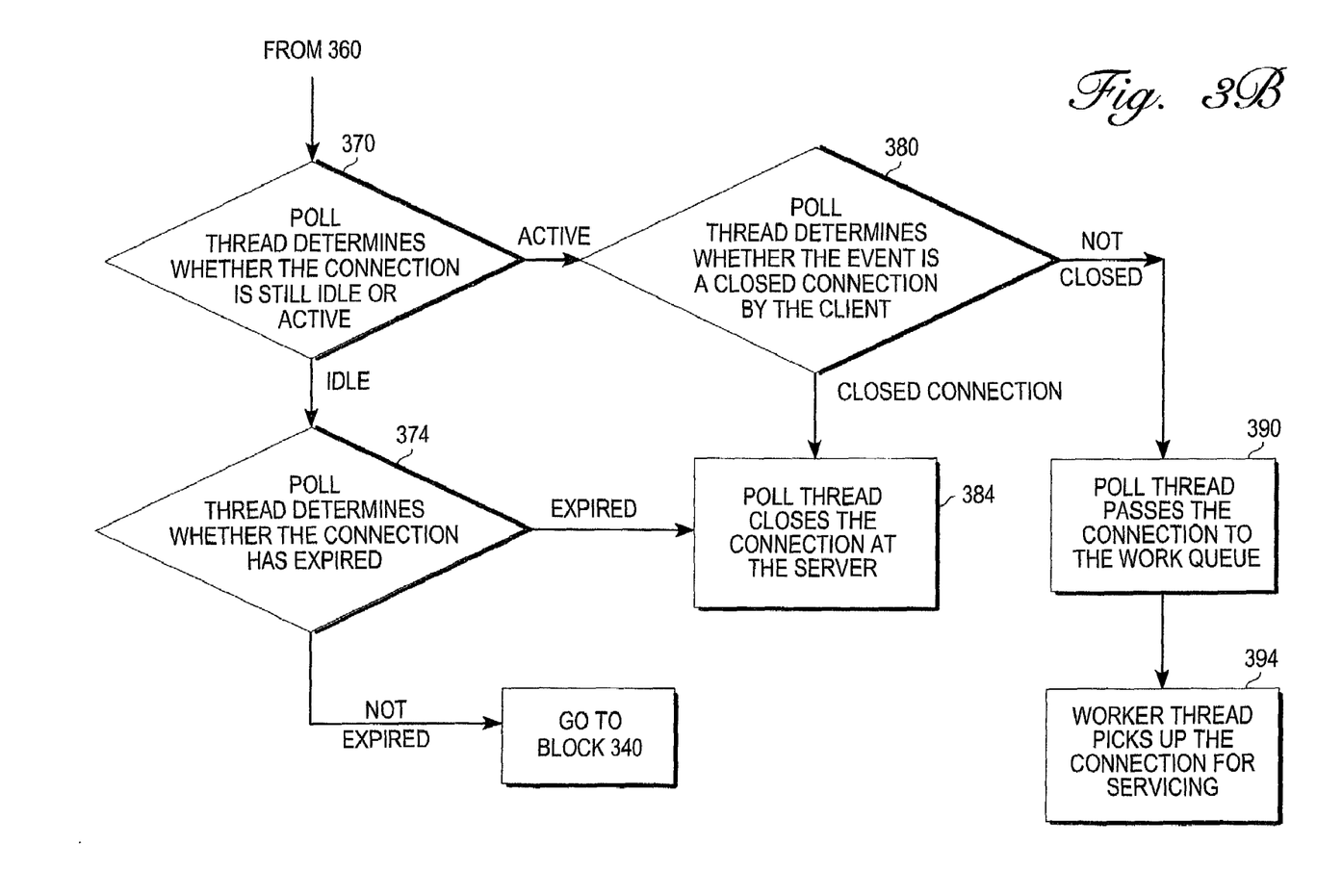

FIG. 3A and FIG. 3B are flowcharts that illustrates a high level overview of one embodiment of a mechanism for servicing connections by disassociating processing resources from idle connections and monitoring the idle connections for activity. In block 300, a worker thread is servicing a connection. For example, worker thread may be receiving data requests from the client over the connection, and the worker thread generates responses to the data requests to send back to the client over the connection.

In block 310, the worker thread determines that the connection is idle. For example, there may be no more requests pending for the connection.

In block 320, the worker thread passes off the idle connection to the poll manager. After passing the connection off, the worker thread is no longer associated with the connection, and the worker thread can return to the work queue to pick up another connection for servicing.

In block 330, the poll manager associates the idle connection with a poll subset. The poll subset may be one of a plurality of poll subsets that are included in the poll manager. In one embodiment, each poll subset is associated with a poll thread.

In block 340, the poll thread sends a poll request to the poll adapter. The poll requests includes the poll subset that identifies each connection that the poll thread is interested in. The poll request may identify the types of events that the poll adapter should check for when polling the connections. The poll thread may send a poll request only after a predetermined time interval has elapsed. For example, the poll thread may send poll requests every X seconds.

In block 350, the poll adapter polls the connections identified in the poll subset. The poll adapter uses the polling system call or a similar monitoring feature of the operating system used by the server. For example, if the operating system is Unix, the poll adapter uses the poll system call.

In block 360, the poll adapter returns the poll subset and events to the poll thread. For example, if the poll adapter returns one or more events for a connection, then the connection is active. The type of event that is pending for the connection is also identified.

In block 370, the poll thread determines for each polled connection whether the connection is still idle or has become active. If the connection is still idle, the process continues to block 374. If the connection is active, the process continues to block 380. Although the example shown in FIG. 3A and FIG. 3B focuses on a single connection, block 370 and the subsequent blocks are repeated for each connection identified in the poll subset included in the poll request from block 340.

In block 374, the poll thread determines whether the connection has expired. For example, the poll thread determines how long the connection has been idle and compares that time to a predetermined time. If the connection has been idle for longer than the predetermined time, the process continues to block 384 for closing of the connection at the server. If the connection has not expired, the process returns to block 340 and the poll thread will make another poll request after the predetermined time interval has elapsed.

In block 380, the poll thread determines whether the event is an exception that indicates a closed connection at the client. For example, the user associated with the client may have closed the connection, or the browser application running on the client may have terminated.

If the connection is closed at the client, in block 384 the poll thread closes the connection at the server. If the connection is not closed by the client, the process continues to block 390.

In block 390, the poll thread passes the now active connection to the work queue. The connection is put into an available space or slot in the work queue to await servicing by a processing resource, such as a worker thread.

In block 394, a worker thread picks up the connection for servicing. The worker thread may or may not be the same worker thread that previously serviced the connection. The worker thread responds to the data sent over the connection, such as generating a response to a data request.

It will be appreciated that the high level overview described above presents just one example of a mechanism for servicing connections by disassociating processing resources from idle connections and monitoring the idle connections for activity. Not all of the features outlined above are necessary for a given embodiment, and in fact some embodiments may contain fewer or more features than those described, as discussed in more detail below.

III. Determining Whether a Connection is Idle

According to one embodiment, a processing resource, such as a worker thread determines whether a connection is idle. A connection is "idle" if no requests are pending while the connection is still open and there are no requests from the connection being processed by a processing resource.

The processing resource knows when it has completed responding to a request, such as by servicing a request by generating a response. However, the connection may not necessarily be idle following the handling of a request because there may be additional activity on the connection, such as additional requests that may be pending for the connection. The processing resource checks the connection to determine whether there is activity on the connection before determining that the connection is idle.

One situation in which there is more than one request pending for a connection is an HTTP pipeline of requests. For example, an electronic document such as a Web page may have links to several different images that are located on the same server. An application at the client, such as a browser, receives the electronic document and identifies the links to the different images. Before the browser can complete rendering the Web page to the user at the client, the browser must retrieve each of the images. The browser may send separate requests for each image to a server, waiting for a response to each request before sending a subsequent request. However, it is more efficient if the browser groups together, or serializes, the image requests into a single block of multiple requests using the HTTP/1.1 pipelining functionality. By not waiting for a response to each request before sending additional requests, the client can more efficiently retrieve the desired images from the server, and the server spends less time waiting for the subsequent requests since the requests are sent together in the same segment.

Even if requests are not pipelined and there are no requests pending on the connection, the processing resource does not necessarily conclude that the connection is idle. It is possible that the connection is still active because additional requests will be coming in a short time in response to additional actions by the client or user. For example, requests may not be pipelined as explained above, in which case a series of requests may be sent by the client to the server. As a result, the processing resource may issue a read request on the connection to determine whether additional requests will be coming in a short period of time, and if so, the processing resource does not determine that the connection is idle, even if no requests are otherwise pending for the connection.

The server administrators may configure the time period during which the processing resource waits for additional activity, such as additional requests, before determining that the connection is idle. For example, a shorter time results in a more efficient use of processing resources, such as worker threads, because more time is spent responding to events and less time in waiting for events. However, if there are frequent short delays between requests, server resources may be wasted by passing such idle connections to a poll manager that quickly determines the connection to be active and hands the connection back to the work queue for servicing again.

If there is no activity on the connection and the read request from the server on the connection indicates that additional requests will not be pending for the connection within the specified time period, the processing resource determines that the connection is idle. As discussed below, idle connections are disassociated from the processing resource and handed off to the poll manager.

In another embodiment, the server process instead of the processing resource determines whether the connection is to be handed off to the poll manager. The server process may use the same or different logic in determining when to hand off a connection to the poll manager. For example, if processing resources are running short, the server process may determine that less active connections are to be handed off to the poll manager so that more active connections are serviced first.

The embodiments described herein are not limited to Web servers and may be implemented in any TCP/IP based client/server application. For example, a file transfer protocol (ftp) server may utilize the same techniques. In addition, the embodiments described herein are not limited to synchronous operating systems and may be implemented in asynchronous operating systems due to the pluggable nature of the poll adapter.

IV. Disassociating Idle Connections

According to one embodiment, after a processing resource determines that a connection is idle, the connection is disassociated from the processing resource and handed off to the poll manager. The processing resource initiates the hand off with the poll manager. The poll manager accepts the connection from the processing resource and assigns the connection to a poll subset, as described below.

After the connection is disassociated from the processing resource, that processing resource is available to service other connections. For example, the processing resource may return to the work queue to pick up another connection that is waiting for servicing.

After the connection is disassociated from the processing resource, there is no logical relationship between the connection and that particular processing resource. If and when the connection becomes active, the connection is returned by the poll manager to the work queue to await servicing by the next available processing resource. While it is possible that the same processing resource that determined that the connection was idle and passed the connection to the poll manger will service the now active connection, such an occurrence is the product of chance and is not predetermined because there is no relationship between the connection and that processing resource after the latter is disassociated from the former.

V. Poll Manager

According to one embodiment, connections are passed off from processing resources to a poll manager. The poll manager is a logical entity that may be implemented in software, hardware, or a combination thereof. The poll manager is responsible for monitoring idle connections to determine if and when the connections become active again. The poll manager includes poll threads that may perform the monitoring function and which may be responsible for timing out and closing connections, as discussed below. The poll threads may close connections in response to receiving a closed connection indication from a client.

As discussed above in reference to FIG. 2, the poll manager includes one or more poll subsets, which are described separately below, and the poll manager includes a poll adapter, which is described separately below.

In one embodiment, the poll manager includes a poll thread for each poll subset. A poll thread is a processing resource that performs the management functions for each poll subset. The poll threads are responsible for accepting idle connections from processing resources, handing back active connections to the work queue, and removing the connection from the poll subset.

In addition, each poll thread is responsible for monitoring the connections in the associated poll subset for activity, such as by polling the connections, at a predetermined interval. For example, the poll thread may be configured to poll a poll subset every 0.5 seconds.

Each poll thread may close connections in response to a closed connection event received from the client or after the connection has been idle for a predetermined length of time, as discussed below.

VI. Poll Subsets

According to one embodiment, the poll manager contains one or more poll subsets that hold idle connections passed off from processing resources to the poll manager. For example, the poll manager may include a single poll subset, or poll queue, that holds all idle connections passed off to the poll manager. Allocation of connections to the poll subsets are handled by the poll manager. For example, poll manager may assign newly added connections to less utilized poll subsets.

According to another embodiment, the poll manager includes a plurality of poll subsets, each of which holds only some of the connections handed off to the poll manager. The use of a plurality of poll subsets can lead to improved efficiency in handling of the connections because each poll subset will be "locked" less frequently than if a single poll queue holding all connections were used. For data integrity, a poll subset is locked each time that a connection is added or removed from the poll subset or a polling request is sent to the poll adapter. If a single poll queue is used and there are a large number of connections being added and removed or the polling rate is high, the poll queue may be locked for a significant amount of time, which precludes other connections from being managed when desired.

The server administrators may configure the poll manager and poll subsets to achieve the desired performance for the server by changing the number of poll subsets, size of the poll subsets, and the polling interval. For example, as the number of poll subsets is increased and the size of the poll subsets are decreased, the locking problem described above lessens as fewer connections are affected each time a poll subset is locked. However, each poll subset consumes server resources, since each must be managed separately by a separate poll thread.

As another example of configuring the poll manager, as the polling interval is reduced, the poll manager detects active connections more quickly. However, each polling operation consumes server resources.

After the poll manager is configured by taking into account the resource and performance constraints above, the effectiveness of the configuration may be judged by the level of customer satisfaction with the server. If the configuration leads to unacceptably long response times, the configuration may be changed or additional resources added.

VII. Poll Adapter

According to one embodiment, the poll thread for each subset sends a poll request to the poll adapter that determines whether any events are pending for the connections in the subset associated with the requesting poll thread. In one embodiment, the poll adapter is an interface between the poll manager and the operating system. For example, the poll adapter may be implemented via software written in the C++ programming language. The operating system executes the system calls or similar functions specified by the poll adapter to determine whether the specified connections are active.

The poll adapter receives the poll request from the poll thread, polls the connections identified in the poll subset that is included in the poll request, and returns a response to the poll thread regarding whether any events are pending for the connections. The poll request from the poll thread to the poll adapter identifies the connections to be checked via the poll subset that is included in the poll request. The poll adapter's response to the poll thread identifies whether any connections have events pending on them, and if so, the type of event.

In one embodiment, the poll adapter monitors the connections using system calls and similar features of the operating system running the server on which the poll manager is implemented. For example, with the Unix operating system, the poll adapter uses the poll system call to identify whether any connection in the poll subset has an event pending and the type of event, if one is pending. As another example, if the server uses NSPR, the NSPR_POLL function. If the operating system of the server using NSPR is Microsoft Windows NT, the NSPR_POLL function is translated into the WaitForMultipleObjects function of Windows NT, which will identify whether a connection has an event pending and the event type. As yet another example, if the server uses NSPR and the operating system for the server is Unix, the NSPR_POLL function is translated into the poll( ) system call.

According to another embodiment, the poll adapter is implemented in a modular manner so that the poll adapter is the only portion of the poll manager that is changed when implementing the poll manager for another operating system. The modular approach includes a standardized interface between the poll adapter and the remaining resources of the poll manager, such that the poll adapter may be described as "pluggable", meaning that different poll adapters may be exchanged or swapped without having to alter the remaining portions of the poll manager.

Not only does the poll adapter make use of the operating system calls or functions, the poll adapter can use both synchronous and asynchronous features of the operating system. As a result, the poll adapter, and the poll manager that the poll adapter is a portion of, may be described as "adaptable" because the poll manager may be implemented using the particular features of a given operating system by using a poll adapter module developed for the particular operating system.

VIII. Monitoring Connections

According to one embodiment, the monitoring of connections to determine if any are active comprises the poll adapter sending a request to the operating system, such as a system call, which identifies the connections to be checked and receiving a response indicating whether an event is pending for the connection and the event type. The response does not include data concerning the event itself, such as a data request, only the event type (e.g., a read). Once the active connection has been passed back by the poll manager to the work queue and a processing resource picks up the connection for servicing, the data associated with the event is accessed by the processing resource.

The request from the poll adapter to the operating system identifies which connections are to be checked for activity. For example, the request may include an array of file descriptors, each of which corresponds to a connection in the poll subset being checked.

The request from the poll adapter to the operating system may identify which event types are to be considered when polling the connections. For example, the poll adapter may generally only ask about reads and exceptions, but not writes, because write operations are typically performed as part of a response by the server to the client instead of as part of a request from the client to the server.

The response to the poll adapter from the operating system identifies which connections have events, and if so, the type of event. If the request limited the types of events to be considered, only connections with those types of events will be identified in the response. The response does not include the event (e.g., the data request). As a result, the poll manager does not read or interpret the data being sent over the connection; rather, the data will be read and interpreted by a processing resource, such as a worker thread, once the connection has been returned by the poll thread to the work queue and is picked up by a processing resource for servicing. However, the poll thread may take actions based on the type of event, such as closing a connection if an exception event has occurred on a connection, as described below.

IX. Closing a Connection

According to one embodiment, the poll thread closes a connection for which the poll adapter determines an exception has occurred. For example, if the response to the poll request indicates that a "closed by peer" exception has occurred, meaning that the client has closed the connection with the server, the poll thread closes the connection at the server and makes the resources previously associated with the connection available for use by other connections and processing resources.

According to another embodiment, the poll thread closes a connection that has expired. For example, the poll manager may be configured with an expiration time period. If a connection is idle for the duration of the expiration time period, the poll manager closes the connection. The poll thread associated with each poll subset may be responsible for checking each connection to determine whether each connection has expired. The expiration function may be referred to as a Keep-Alive Timeout, indicating that an idle connection will be kept open, or alive, for a predetermined period of time.

Once a connection is closed, the server resources associated with the connection are made available for use by other connections and server processes. For example, if the closed connection were included in a poll subset, the connection would be removed from the poll subset so that another connection may be added to the poll subset.

X. Work Sub-queues

According to another embodiment, the work queue of a server process is divided into sub-queues. Recall that the poll manager may be implemented using more than one poll subset instead of a single poll queue to reduce the unavailability of the poll queue when it is locked due to other operations. The work queue of a server process may have similar locking concerns, which may in fact be more pronounced because the work queue may contain considerably more connections than a poll queue of a poll manager. Furthermore, there are more resources making demands of the work queue, including acceptor threads that put connections into the work queue, worker threads that remove connections from the work queue, and a poll manager that puts active connections into the work queue.

Instead of a single work queue, a server process comprises a plurality of sub-queues. Each sub-queue is associated with one or more worker threads that service connections held in each sub-queue. Each time that a sub-queue is locked for the addition or removal of a connection, fewer other connections are affected because each sub-queue only holds some of the total number of connections that would be held by a single worker queue.

Allocation of connections to the work queue may be managed by a work queue manager. For example, the work queue manager may monitor the number of connections assigned to each sub-queue and assign newly added connections to less utilized sub-queues.

Figure 4:
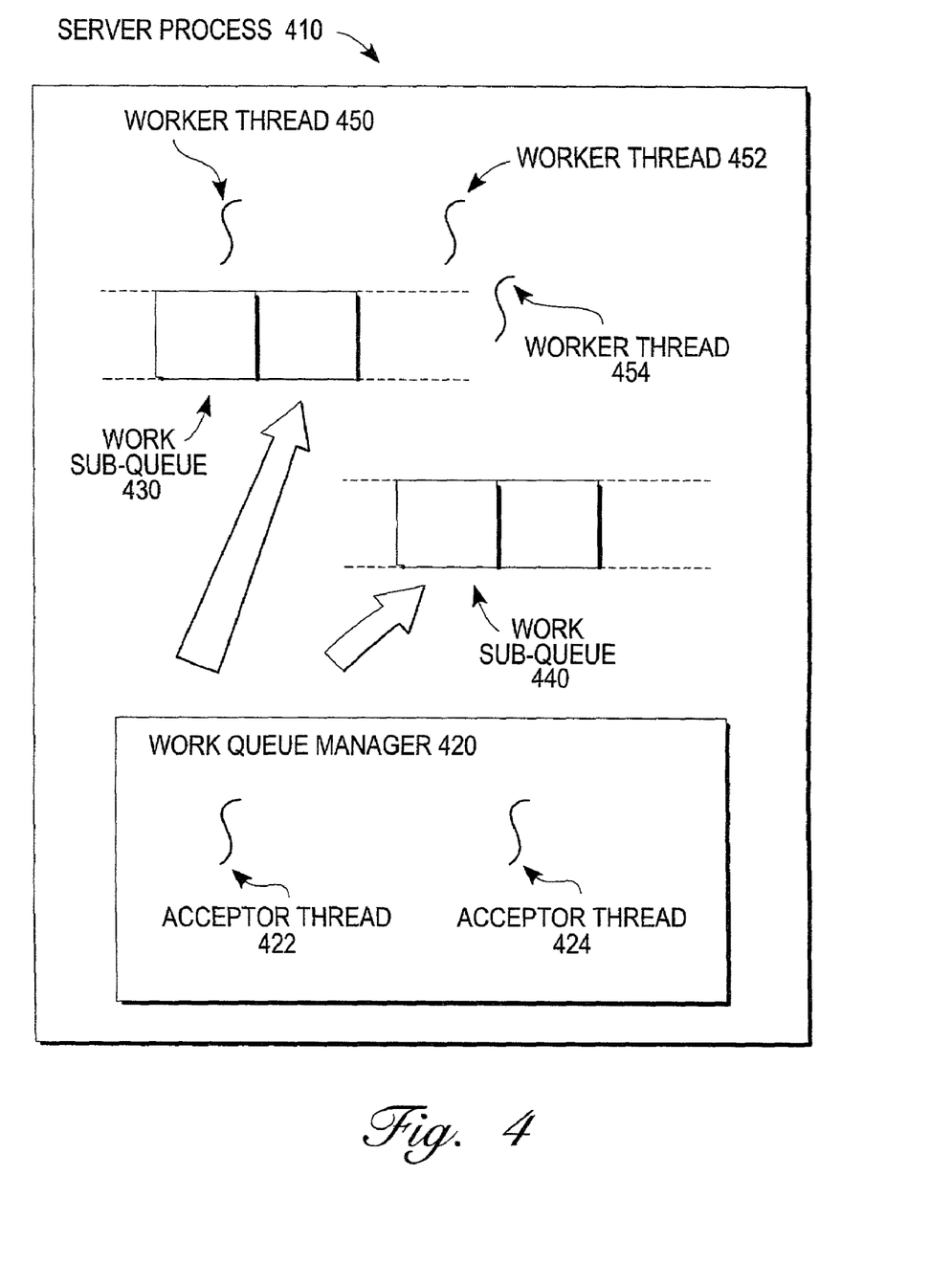
FIG. 4 is a block diagram that illustrates one embodiment of a server process that includes a plurality of sub-queues in place of a work queue.

FIG. 4 is a block diagram that illustrates one embodiment of a server process that includes a plurality of sub-queues in place of a work queue.

In FIG. 4, there is a server process 410, such as a daemon described above. Server process 410 includes a work queue manager 420 and work sub-queues 430, 440. Work queue manager 420 is responsible for managing work sub-queues 430, 440, which may include monitoring work sub-queues 430, 440 to determine the capacity of each and determining which sub-queue to assign connections established with server process 410. Work queue manager 420 includes acceptor threads 422, 424 for accepting connections at server process 410 and passing the connections to work sub-queues 430, 440.

Server process 410 includes worker threads 450, 452, 454 that pick-up and service connections from work sub-queues 430, 440. Worker threads 450, 452, 454 may each be assigned to a particular sub-queue or each may be able to pick up a connection from more than one or all sub-queues.

Because connections awaiting service are allocated to more than one queue, such as work sub-queues 430, 440 shown in FIG. 4, each time a queue is locked to allow a connection to be added or deleted, fewer other connections are affected. For a server handling many connections, the reduced contention for each queue allows for more efficient servicing of connections. For example, if a connection is being added to work sub-queue 430, there is no impact on work sub-queue 440 so that a connection may be added or removed from work sub-queue 440 at the same time as the connection is being added to work sub-queue 430. If there were only one work queue for a server process, such as work queue 138 shown in FIG. 1, the work queue would be locked to allow a connection to be added, and other processing resources would have to wait until the work queue is unlocked to add or remove other connections.

The implementation of sub-queues in place of a single work queue is independent of whether idle connections are disassociated from processing resources to be handed off to a poll manager that checks the connections to determine if and when the connections become active.

XI. Hardware Overview

Figure 5:
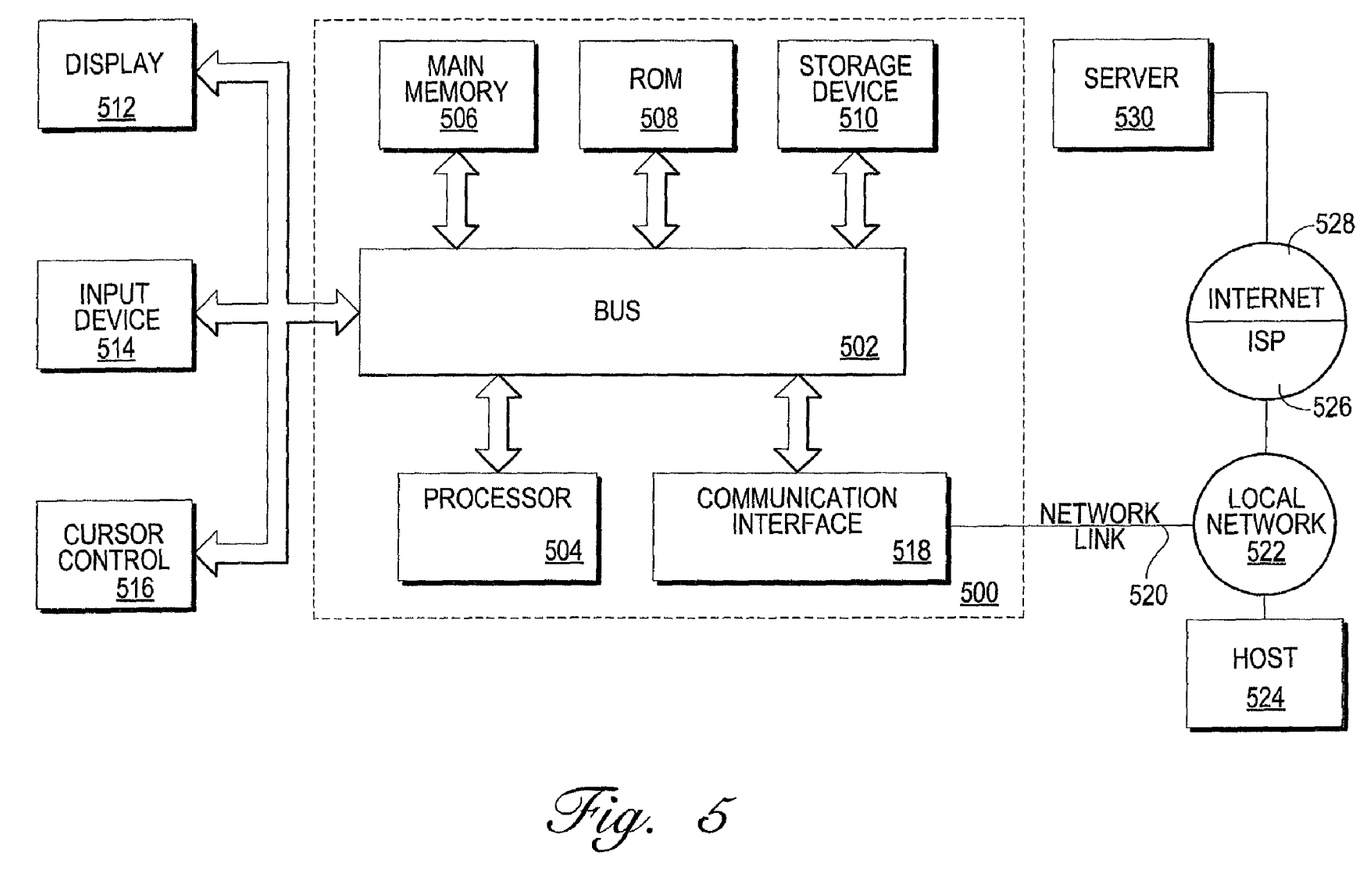
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for servicing connections by disassociating processing resources from idle connections and monitoring the idle connections for activity. According to one embodiment of the invention, servicing connections by disassociating processing resources from idle connections and monitoring the idle connections for activity is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for analyzing a Layer 2 path in a switched network as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system wherein a plurality of connections have been established with a plurality of entities, a computer-implemented method for servicing a connection, comprising:
   servicing said connection with a first processing resource;
   when said connection is idle, disassociating said first processing resource from said connection;
   after disassociating said first processing resource from said connection, associating said connection with a particular poll subset of a plurality of poll subsets, and wherein each poll subset of said plurality of poll subsets can be locked without affecting any other poll subset of said plurality of poll subsets;
   monitoring said connection for activity; and
   when there is activity on said connection, servicing said connection with a second processing resource.

2. The method of claim 1, wherein said monitoring comprises:
   polling said connection for one or more events that are pending for said connection; and
   when one or more events are pending for said connection, servicing said connection with a second processing resource.

3. The method of claim 1, wherein said first processing resource and said second processing resource are the same processing resource.

4. The method of claim 1, wherein said first processing resource and said second processing resource are different processing resources.

5. The method of claim 1, wherein said first processing resource comprises a first worker thread, and wherein said second processing resource comprises a second worker thread.

6. The method of claim 1, wherein an X number of connections have been established by said computer system, and wherein said computer system has a Y number of processing resources, wherein Y is less than X.

7. The method of claim 1, further comprising:
   after disassociating said first processing resource from said connection, associating said connection with a queue.

8. The method of claim 2, further comprising:
   when one or more events are not pending for said connection, repeating said polling of said connection.

9. The method of claim 2, further comprising:
   when one or more events are not pending for said connection for a predetermined time period, closing said connection.

10. The method of claim 2, wherein said one or more events indicates that said connection has been closed at an entity associated with said connection, and further comprising:
    when said connection has been closed at said entity associated with said connection, closing said connection.

11. The method of claim 2, wherein said polling is in response to a request that comprises first data that identifies one or more connections to be polled.

12. The method of claim 11, wherein said request further comprises second data that identifies one or more event types for which said one or more connections are to be polled.

13. The method of claim 2, wherein said polling comprises:
    polling said connection using one or more synchronous features of an operating system that is associated with said computer system.

14. The method of claim 2, wherein said polling comprises:
    polling said connection using one or more asynchronous features of an operating system that is associated with said computer system.

15. The method of claim 1, further comprising:
    prior to servicing said connection with said first processing resource, associating said connection with a particular sub-queue from among a plurality of sub-queues, wherein each sub-queue of said plurality of sub-queues can be locked without affecting any other sub-queues.

16. An apparatus for servicing connections in a computer system, comprising:
    a first processing resource that services a connection;
    a managing agent that receives said connection after said connection is disassociated from said first processing resource when said connection is idle; wherein said managing agent associates said connection with a particular poll subset of a plurality of poll subsets after said connection is disassociated from said first processing resource, and wherein each poll subset of said plurality of poll subsets can be locked without affecting any other poll subset of said plurality of poll subsets;
    an interface that monitors said connection for activity; and
    a second processing resource that services said connection when there is activity on said connection.

17. The apparatus of claim 16, wherein said interface monitors said connection for activity by polling said connection for one or more events that are pending for said connection and wherein said second processing resource services said connection when one or more events are pending for said connection.

18. The apparatus of claim 16, wherein said first processing resource and said second processing resource are the same processing resource.

19. The apparatus of claim 16, wherein said first processing resource and said second processing resource are different processing resources.

20. The apparatus of claim 16, wherein said first processing resource comprises a first worker thread, and wherein said second processing resource comprises a second worker thread.

21. The apparatus of claim 16, wherein an X number of connections have been established by said computer system, and wherein said computer system has a Y number of processing resources, wherein Y is less than X.

22. The apparatus of claim 16, further comprising:
a first queue for holding said connection after said managing agent receives said connection.

23. The apparatus of claim 17, wherein said interface repeats said polling of said connection when one or more events are not pending for said connection.

24. The apparatus of claim 17, wherein said managing agent closes said connection when one or more events are not pending for said connection for a predetermined time period.

25. The apparatus of claim 17, wherein said one or more events indicates that said connection has been closed at an entity associated with said connection, and wherein said managing agent closes said connection when said connection has been closed at said entity associated with said connection.

26. The apparatus of claim 17, wherein said interface polls said connection in response to a request that comprises first data that identifies one or more connections to be polled.

27. The apparatus of claim 26, wherein said request further comprises second data that identifies one or more event types for which said one or more connections are to be polled.

28. The apparatus of claim 17, wherein said interface polls said connection using one or more synchronous features of an operating system that is associated with said computer system.

29. The apparatus of claim 17, wherein said interface polls said connection using one or more asynchronous features of an operating system that is associated with said computer system.

30. The apparatus of claim 16, further comprising:
a second queue for holding said connection when one or more events are pending for said connection.

31. The apparatus of claim 30, wherein said second queue receives said connection from said managing agent and wherein said second processing resource retrieves said connection from said second queue prior to servicing said connection.

32. The apparatus of claim 30, wherein
said second queue is comprised of a plurality of sub-queues,
each sub-queue of said plurality of sub-queues can be locked without affecting any other sub-queues, and
said connection is associated with a particular sub-queue from among said plurality of sub-queues prior to said first processing resource servicing said connection.

33. A computer-readable medium having stored thereon instructions which, when executed by one or more processors, cause the one or more processors to service a connection in a computer system wherein a plurality of connections have been established with a plurality of entities, said computer-readable medium comprising:
instructions for causing the one or more processors to service said connection with a first processing resource;
instructions for causing the one or more processors to disassociate said first processing resource from said connection when said connection is idle;
instructions for causing the one or more processors to associate said connection with a particular poll subset of a plurality of poll subsets after disassociating said first processing resource from said connection, wherein each poll subset of said plurality of poll subsets can be locked without affecting any other poll subset of said plurality of poll subsets;
instructions for causing the one or more processors to monitor said connection for activity; and
instructions for causing the one or more processors to service said connection with a second processing resource when there is activity on said connection.

34. The computer-readable medium of claim 33, wherein said instructions for causing one or more processes to monitor said connection for activity comprises:
instructions for causing one or more processors to poll said connection for one or more events that are pending for said connection; and
when one or more events are pending for said connection, instructions for causing said one or more processors to service said connection with a second processing resource.

35. The computer-readable medium of claim 33, wherein said first processing resource and said second processing resource are the same processing resource.

36. The computer-readable medium of claim 33, wherein said first processing resource and said second processing resource are different processing resources.

37. The computer-readable medium of claim 33, wherein said first processing resource comprises a first worker thread, and wherein said second processing resource comprises a second worker thread.

38. The computer-readable medium of claim 33, wherein an X number of connections have been established by said computer system, and wherein said computer system has a Y number of processing resources, wherein Y is less than X.

39. The computer-readable medium of claim 33, further comprising:
instructions for causing one or more processors to associate said connection with a queue after disassociating said first processing resource from said connection.

40. The computer-readable medium of claim 34, further comprising:
instructions for causing one or more processors to repeat said polling of said connection when one or more events are not pending for said connection.

41. The computer-readable medium of claim 34, further comprising:
instructions for causing one or more processors to close said connection when one or more events are not pending for said connection for a predetermined time period.

42. The computer-readable medium of claim 34, wherein said one or more events indicates that said connection has been closed at an entity associated with said connection, and further comprising:
instructions for causing one or more processors to close said connection when said connection has been closed at said entity associated with said connection.

43. The computer-readable medium of claim 34, wherein said connection is polled in response to a request that comprises first data that identifies one or more connections to be polled.

44. The computer-readable medium of claim 43, wherein said request further comprises second data that identifies one or more event types for which said one or more connections are to be polled.

45. The computer-readable medium of claim 34, wherein said instructions for causing one or more processors to poll said connection comprises:
instructions for causing one or more processors to poll said connection using one or more synchronous features of an operating system that is associated with said computer system.

46. The computer-readable medium of claim 34, wherein said instructions for causing one or more processors to poll said connection comprises:

instructions for causing one or more processors to poll said connection using one or more asynchronous features of an operating system that is associated with said computer system.

47. The computer-readable medium of claim 33, further comprising:

instructions for causing one or more processors to associate said connection with a particular sub-queue from among a plurality of sub-queues prior to servicing said connection with said first processing resource, wherein each sub-queue of said plurality of sub-queues can be locked without affecting any other sub-queues.

* * * * *